United States Patent
Le (10) Patent No.: US 9,167,638 B2
(45) Date of Patent: Oct. 20, 2015

(54) LED CONTROLLER CIRCUIT

(71) Applicant: NXP B.V., Eindhoven (NL)

(72) Inventor: Nguyen Trieu Luan Le, Cormelles le Royal (FR)

(73) Assignee: NXP B.V., Eindhoven (NL)

( * ) Notice: Subject to any disclaimer, the term of this patent is extended or adjusted under 35 U.S.C. 154(b) by 119 days.

(21) Appl. No.: 13/963,347

(22) Filed: Aug. 9, 2013

(65) Prior Publication Data

US 2014/0049173 A1    Feb. 20, 2014

(30) Foreign Application Priority Data

Aug. 14, 2012 (EP) ................................ 12290272

(51) Int. Cl.
   *H05B 33/08* (2006.01)
   *H05B 41/282* (2006.01)
   *H05B 41/392* (2006.01)

(52) U.S. Cl.
   CPC ........ *H05B 33/0809* (2013.01); *H05B 33/0815* (2013.01); *H05B 33/0848* (2013.01); *Y02B 20/347* (2013.01)

(58) Field of Classification Search
   None
   See application file for complete search history.

(56) References Cited

U.S. PATENT DOCUMENTS

2012/0049752 A1* 3/2012 King et al. ............. 315/210
2012/0112651 A1  5/2012 King et al.

FOREIGN PATENT DOCUMENTS

WO    2011/008635 A1    1/2011

OTHER PUBLICATIONS

"iW3612 AC/DC Digital Power Controller for Dimmable LED Drivers—Rev. 1.1", IWatt, 18 pgs. retrieved from the internet at: iwatt.com/files/iw3612-datasheet/ (Feb. 1, 2012).
Extended European Search Report for Patent Appln. No. 12290272.9 (Feb. 14, 2013).

* cited by examiner

*Primary Examiner* — Douglas W Owens
*Assistant Examiner* — Dedei K Hammond (57) ABSTRACT

An LED controller circuit for use in an LED drive circuit in which a coil current control scheme is used to deliver power to an LED arrangement from a phase cut dimmer. The controller circuit includes means for determining, based on an analysis/signal processing of the on-time of the transistor, the dimmer characteristics, including the on state and off states of the ac dimmed voltage signal. This avoids the need for the controller circuit to process the dimmer output.

13 Claims, 6 Drawing Sheets

LED CONTROLLER CIRCUIT

CROSS-REFERENCE TO RELATED APPLICATIONS

This application claims the priority under 35 U.S.C. §119 of European patent application no. 12290272.9, filed on Aug. 14, 2012, the contents of which are incorporated by reference herein.

This invention relates to LED controller circuits, and in particular to enable the control of LEDs which are connected to phase cut dimmer circuits.

Light intensity variation is commonly implemented using phase cut dimmers. Such a dimmer is inserted between a mains supply and a lamp. It modifies the voltage shape to modulate the power provided to the lamp and thus the light intensity. The light dimming operation is straightforward with an incandescent light bulb because it is a pure resistive load and does not therefore require special electronics control. This is not the case with LED lamps.

In order to have good light quality in a dimmable LED system, specific control is required.

A generic power supply controller which is able to be used for different dimmer schemes needs to be able to detect the dimmer's phase and often the dimmer type such as forward phase control (leading edge) or reverse phase control (trailing edge).

This generic power supply controller then enables the LED to be powered by any dimmer circuit that is already in place, when replacing an incandescent bulb with LEDs.

Figure 1A:
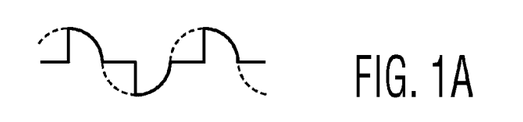
Figure 1B:
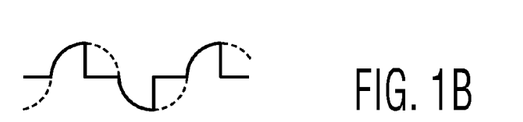

FIG. 1 shows the two basic known phase cut dimmer modes of operation.

In leading edge control, shown in FIG. 1(a), the timing within the ac cycle at which the sinusoidal power supply is fed to the lamp is controlled. This timing determines the shape of the power supply as shown by the shaded areas of the graph.

In trailing edge control, shown in FIG. 1(b), the timing within the ac cycle at which the sinusoidal power supply is ceased is controlled. This timing again determines the shape of the power supply as shown by the shaded areas of the graph.

To extract information as to whether leading edge or trailing edge control is used, a connection to the dimmer output is used, which typically implies a dedicated pin at the LED driver IC as well as potentially high voltage compatible devices.

It is possible to make a dimmable solution without knowing the exact dimmer type as well as conduction angle. However, superior dimmer compatibility as well as achievement of other performance, such as LED current ripple, requires this information to be provided to the power supply controller.

Dimmer type and dimmer conduction angle detection is traditionally performed using voltage comparators at different threshold levels connecting to the dimmer output signal. Several comparators or even a full analog to digital converter can be used to enhance the dimmer type detection.

The dimmer type is detected based on the time difference between the edges of the comparator's output. A large time difference between falling edges of the two comparators indicates a leading edge dimmer. A large time difference between rising edges of the two comparators indicates a trailing edge dimmer.

The time difference between the rising and falling edge of the comparator with the lowest threshold ($T_{DIMMER}$) and the time difference between two consecutive rising (or falling) edges i.e. the mains period ($T_{MAIN}$) are extracted to estimate the conduction angle.

Figure 2A:
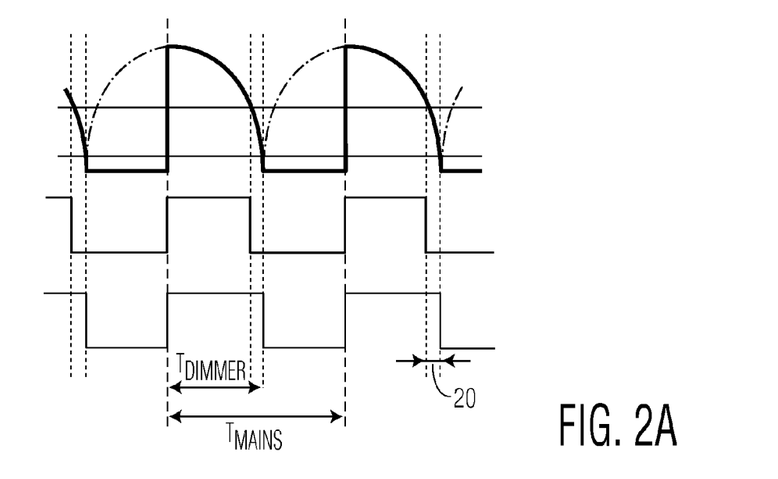
FIGS. 2a-b show a known way to detect leading and trailing edge control from a dimmer output, respectively.
Figure 2B:
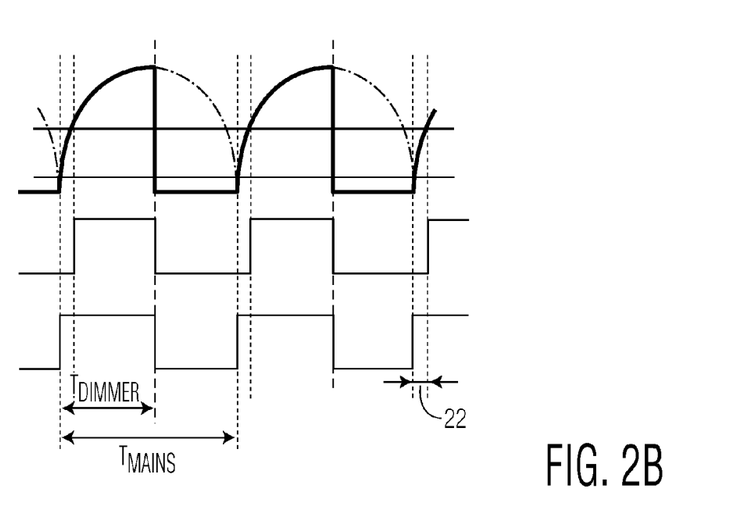

These parameters are shown in FIG. 2. The top comparator plot is for a comparator which has as its threshold a mid voltage. The bottom comparator plot is for a comparator which has as its threshold a low voltage.

FIG. 2(a) shows leading edge control, and shows the parameters $T_{DIMMER}$ and $T_{MAIN}$ defined above with respect to the two comparator signals.

A time delay between falling edges is shown as 20, which indicates that the falling part of the curve is sinusoidal (and the rising part is abrupt).

FIG. 2(b) shows trailing edge control, and again shows the parameters $T_{DIMMER}$ and $T_{MAIN}$ defined above. A time delay between rising edges is shown as 22, which indicates that the rising part of the curve is sinusoidal (and the falling part is abrupt).

Changing the dimmer conduction angle will move the rising front of the dimmer in case of a leading edge dimmer (FIG. 2(a)) and the falling front of the trailing edge dimmer (FIG. 2(b)). During this transitory state, the detection of the period is more accurate if measuring the (static) time between two falling edges for a leading edge dimmer and between two rising edges for a trailing edge dimmer. Thus, knowledge of the dimmer type enables more accurate measurement of the period. To improve the compatibility with the dimmer, actions are for example taken during the off time of the dimmer, and these actions differ depending on the type of the dimmer. Thus, detection of the dimmer type is useful for various reasons.

One drawback of this method is the need of a specific input pin at the controller circuit to sense the dimmer output voltage as well as dedicated comparators (at least two). This translates into a higher cost as well as larger footprint. Furthermore, the usage of voltage comparators makes the implementation highly dependent on the input voltage amplitude.

According to the invention, there is provided an LED controller circuit, wherein the controller circuit is for controlling an inductive power converter which includes a transistor for conducting an inductor current, and the inductor is driven by a drive voltage received from a dimmer circuit, wherein the controller circuit comprises:

a feedback arrangement for controlling the transistor in response to upper and lower thresholds of the inductor current; and means for determining, based on an analysis or signal processing of the on-time of the transistor, dimmer characteristics, including at least the on state and off states of the ac dimmed voltage signal.

This circuit uses a current control power converter in order to perform at least dimmer presence detection. It can be used to detect type and conduction angle detection without requiring direct access to the dimmer circuit outputs. Instead, it simply requires the transistor on-time or switching period.

Inductor current control schemes are well known in modern power converters. They involve adjusting a peak and optionally the ripple value of a coil current in order to transfer the desired power level. This invention is for a power controller using such a coil current control scheme, and enables the dimmer characteristics to be determined from the transistor on-time or switching period.

The means for determining can comprise a processor.

The processor is preferably adapted to determine the dimmer characteristics based on the gate signal of the transistor.

The processor can for example determine an off-state of the dimmer when the transistor on-time exceeds a certain limit.

The limit can be determined experimentally based on the dimmer characteristics and input voltage characteristics as well as an application component value such as coil value (since the on-time duration or switching period depends strongly on the coil value).

The processor can detect an on-state of the dimmer as soon as the transistor is switched off.

The processor is preferably adapted to monitor the input voltage variation based on the transistor on-time or switching period variation.

In one example, the processor is adapted to detect whether leading edge or trailing edge dimming is implemented, and is adapted to detect a leading edge dimmer based on the transistor on-time or switching period when the dimmer enters the on-state, or to detect a trailing edge dimmer based on the MOSFET on-time when the dimmer enters the off-state. As there are only two types of dimmer to be detected, only one detection method approach is needed of these two possible approaches.

Again, the detection can be based on the on-time or switching period being below a certain limit, the value of which is determined experimentally based on the input voltage characteristics as well as application component value such as coil value.

The circuit can be implemented with a digital signal processor for analyzing the gate signal time variations. However, an analogue circuit implementation is also possible for determining the on-state and off-state of the dimmer based on analogue processing of the transistor gate signal. Thus, the means for determining can be an analogue circuit.

The invention also provides a method of detecting dimmer characteristics from a dimmed ac input voltage signal, comprising:
  driving an inductor using the input voltage;
  conducting the inductor current through a transistor;
  controlling the transistor in response to upper and lower thresholds of the inductor current; and
  determining, based on an analysis of the on-time of the transistor, dimmer characteristics, including at least the on state and off states of the ac dimmed voltage signal.

An example of the invention will now be described in detail, with reference to the accompanying drawings, in which:

FIGS. 1a-b show leading edge and trailing edge phase cut dimming approaches, respectively;

The invention provides an LED controller circuit for an LED drive circuit in which a coil current control scheme is used to deliver power to an LED arrangement from a phase cut dimmer. The controller circuit includes means for determining, based on an analysis/signal processing of the on-time of the transistor, the dimmer characteristics, including the on state and off states of the ac dimmed voltage signal. The invention provides an LED driver which can be included in an LED lamp replacing an existing (e,g, halogen) lamp. The dimmer switch is for example mounted on the wall of a room. The controller then provides compatibility of LED lamps with existing wall dimmers, so that only the lamps can be replaced and not the dimmers.

Figure 3A:
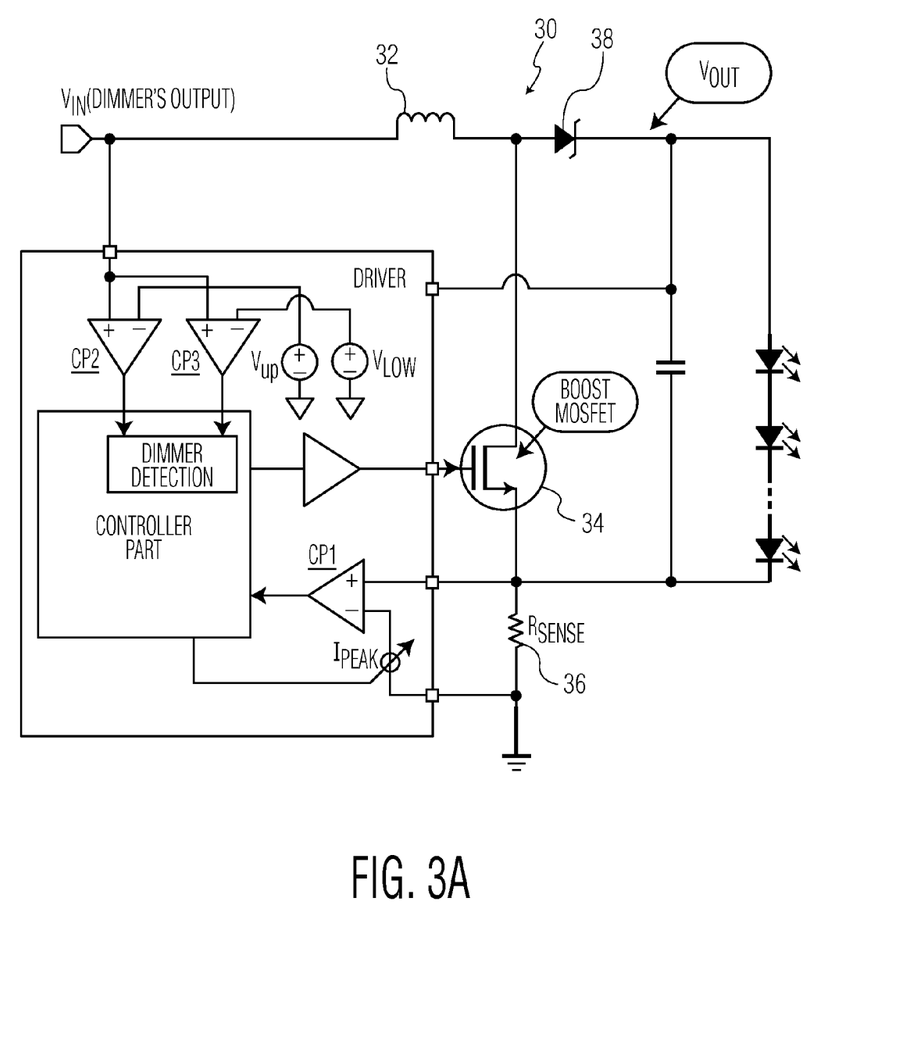
FIGS. 3a-b show a known LED controller and an LED controller of the invention, respectively.
Figure 3B:
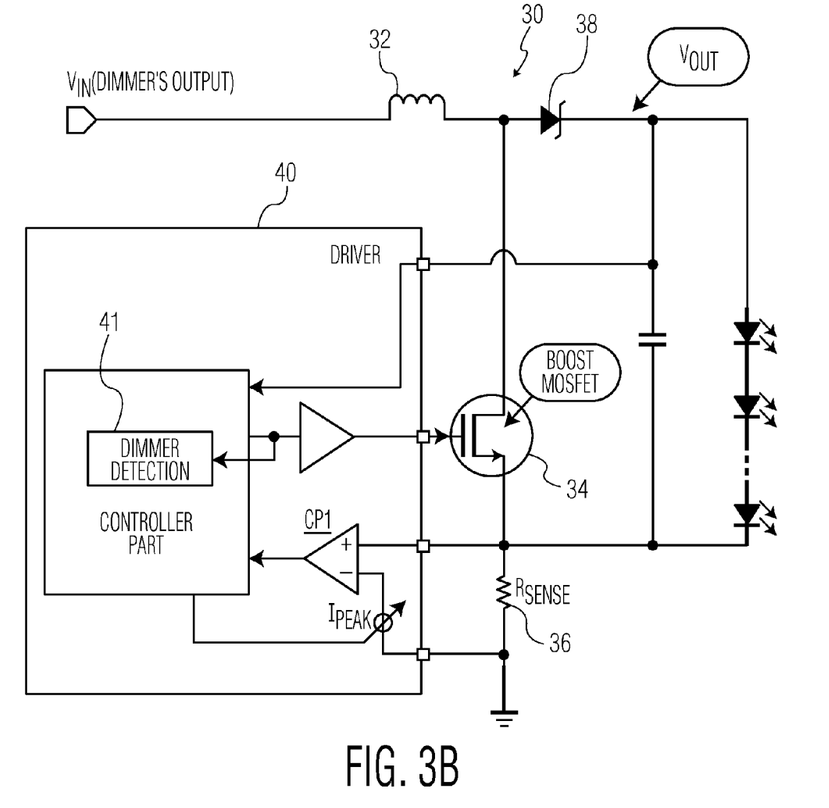

The invention for example relates to an LED control circuit which uses a boost controller circuit to drive an LED or bank of LEDs. FIG. 3 shows a known boost controller circuit (FIG. 3a) and a boost controller circuit using the control circuit of the invention (FIG. 3b).

The features common to the two circuits will first be described.

An input voltage $V_{IN}$ is received by the control circuit 40. This is received from the output of a dimmer, and the purpose of the circuit is to determine the nature of the dimmer which has generated the signal $V_{IN}$. The input signal $V_{IN}$ is where power is taken.

The LED circuit 30 generates an output voltage Vout derived from the input voltage Vin. One side of a coil 32 is connected to the input and the other side connects to ground through a boost transistor 34 (a power MOSFET) and a sense resistor 36 ($R_{SENSE}$). The other side of the coil 32 connects to the output Vout through a diode 38. This defines the well-known boost converter circuit.

The power MOSFET 34 is controlled by the controller 40 which receives feedback information from the sense resistor 36.

During the on time of the power MOSFET 34, the coil current, $I_{COIL}$, runs through the sense resistor $R_{SENSE}$ ($V_{SENSE} = I_{COIL} * R_{SENSE}$).

The controller switches off the power MOSFET as soon as $I_{COIL}$ exceeds a predefined threshold value $I_{COILMAX\_TH}$. When $I_{COIL}$ drops below a second threshold $I_{COILMIN\_TH}$ or after a fixed time period, the controller switches on again the power MOSFET.

The invention relates to the controller 40.

In the known arrangement, the controller 40 receives the input voltage $V_{IN}$ and performs dimmer detection based on a comparison of the input voltage with a set of thresholds using a comparator array, as shown. In the example shown, two comparators are used, which compare with voltages $V_{MID}$ and $V_{LOW}$. This enables the analysis to be carried out as explained with reference to FIG. 2/

The controller 40 generates the gate signal for the boost transistor 34, based on processing of the voltage detected across the sense resistor 36.

In the arrangement of the invention as shown in FIG. 3b, the controller 40 does not need the output signal from the dimmer ($V_{IN}$). Thus, the controller (which is a discrete IC) does not need to have a direct connection to the output of the dimmer. The inputs to the controller 40 comprise firstly the voltages at each end of the LED chain. One of these is the voltage on one terminal of the sense resistor, and secondly the voltage on the other terminal of the sense resistor is also provided to the controller. Thus, one less input is required to the controller 40 compared to the circuit in FIG. 3(a).

The dimmer detection (unit 41) is based only on the signal provided to the gate of the transistor 34, as shown.

Monitoring the voltage shape at the output of the dimmer (i.e. on $V_{IN}$) is needed to derive information on the dimmer's state and type, but in the arrangement of the invention, this monitoring is carried out at another point instead of at the output of the dimmer itself. Furthermore, the parameter which is measured is not a voltage but a timing value.

When the MOSFET 34 is conducting, the coil current is flowing from the dimmer's output to the ground via the coil 32, the MOSFET 34 (which is acting as a small value resistance) and the resistor 36 (used for sensing the coil current). The coil current increases at a rate which is proportional to the dimmer's output voltage. At this point the dimmer's output voltage information can be retrieved based on the coil current variation speed (coil current slope).

The principle of the DC-to-DC controller 30 is to control the MOSFET switching time based on the coil current. The MOSFET is switched off when the coil current exceeds a given threshold. The threshold can be considered as constant during one cycle of the dimmer's output signal. In this case, the time for the coil current to reach the predefined threshold is proportional to the coil current slope and thus the dimmer's output voltage.

Therefore, by measuring the on-time of the transistor 34, an exact image of the dimmer's output voltage can be derived without requiring direct access to the voltage waveform. In this way, the transistor on time is monitored instead of the dimmer's output voltage.

When the dimmer's output voltage is 0 or very low, the MOSFET on-time is very long (>100 us). Conversely, when the dimmer's output voltage is high, the MOSFET on-time can be very short (a few us). This difference is used to discriminate between the dimmer's on and off state. The complete MOSFET switching period (instead of only the on time) can also be measured instead of the on time. This is easier to do and yet accurate enough to perform the wanted detection.

The time duration between the switching on and switching off of the power MOSFET is directly linked to the value of the input voltage by the following equation:

$$T_{ON}=L*(I_{COILMAX\_TH}-I_{COILMIN\_TH})/V_{IN}$$

This shows that by measuring the MOSFET on time or switching period (which includes the on time), it is possible to estimate the value of $V_{IN}$ (dimmer's output voltage). For the dimmer type and conduction angle detection, it is not necessary to know the exact value of $V_{IN}$. The speed of change in $V_{IN}$ as well as the time zone where $V_{IN}>0$ are the only required information.

It can be seen from the equation above that if $V_{IN}=0$, the $T_{ON}$ approaches infinity. Thus, a threshold can be set for detecting $V_{IN}=0$. A lower threshold can be set for detecting a minimum threshold value of $V_{IN}$.

Figure 4:
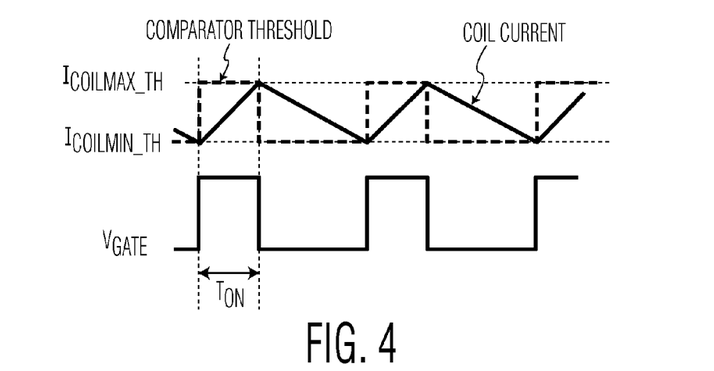
FIG. 4 is a timing diagram for the operation of the circuit of FIG. 3b.

FIG. 4 shows the signal waveforms in the case of a hysteretic controller (constant maximum and minimum coil current).

The MOSFET is set on to allow the coil current to increase linearly until it exceeds $I_{COILMAX\_TH}$. Once the coil current reaches this value, the MOSFET is switched off and the coil current comparator threshold is changed to $I_{COILMIN\_TH}$. The MOSFET remains off until the coil current drops below this threshold and the cycle starts again.

The on time $T_{ON}$ of the MOSFET is shown in FIG. 4 and as explained above is used to determine the dimmer type and conduction angle. This approach is valid for other types of controller (constant switching frequency for example).

Using a counter to trigger when the MOSFET on-time exceeds a predefined value is equivalent to detecting if $V_{IN}$ is below a predefined value. The speed of variation in the MOSFET on-time is proportional to the speed of variation of $V_{IN}$. This is used to determine the dimmer's type. A sudden decrease/increase in the on-time indicates the presence of a leading/trailing edge dimmer.

Figure 5:
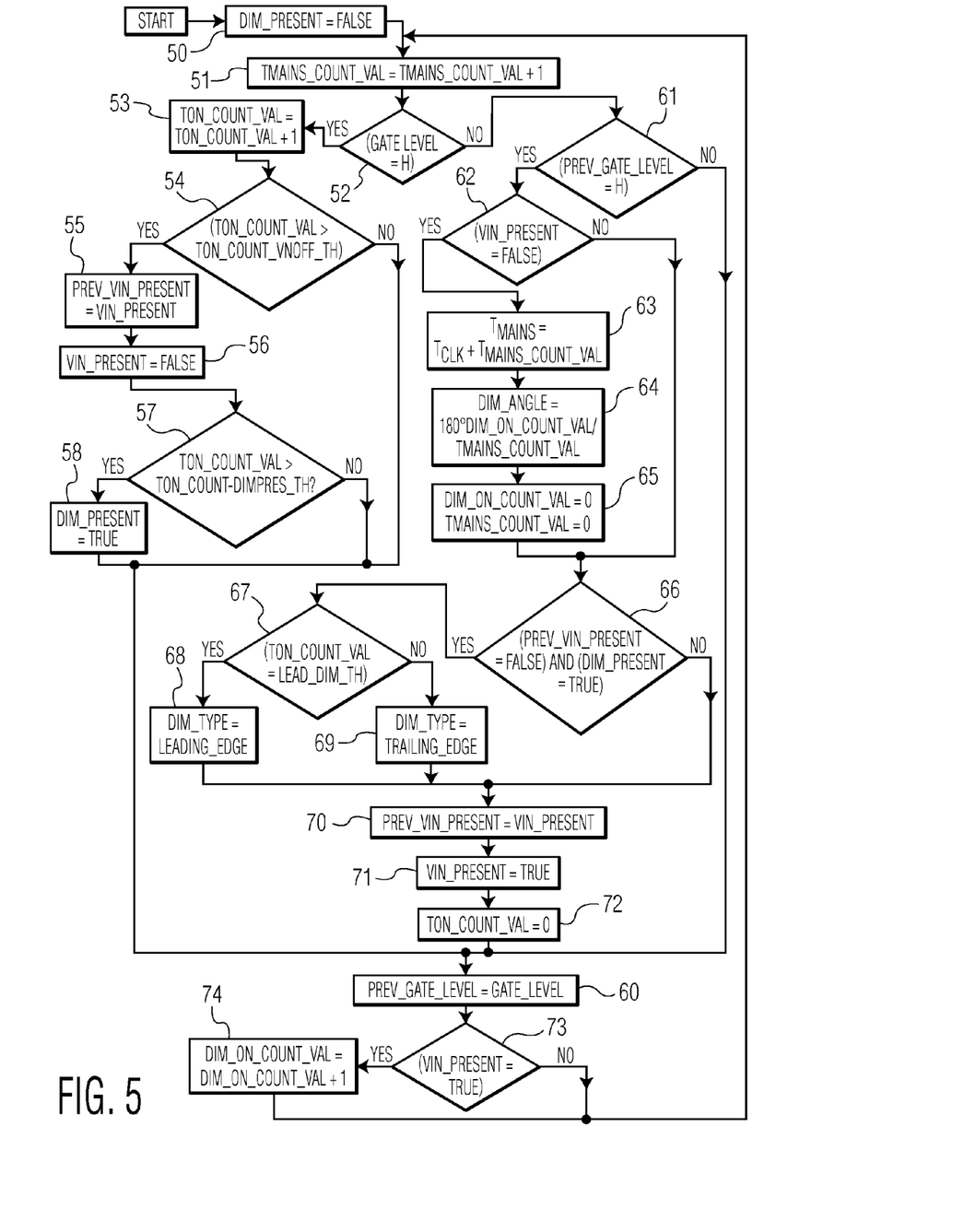
FIG. 5 is a flow chart showing the method of the invention.

An example of dimmer type and conduction angle detection algorithm is shown in FIG. 5.

The algorithm is described for a synchronous system with a system clock period of $T_{CLK}$. TMAINS_COUNT_VAL is the number of system clock periods per mains period. TON_COUNT_VAL is the number of system clock periods during the on-time of the MOSFET per converter switching period. VIN_STATE is true when the input voltage is higher than 0V. VIN_STATE is false when the input voltage is equal to 0V. Thus, VIN_STATE indicates the on-time period of the input voltage VIN.

Several timing limits are used to determine the different states.

If the MOSFET gate voltage remains high for a number of system clock periods exceeding TON_COUNT_VINOFF_TH then it is considered that the input voltage is equal to 0 and VIN_STATE is set to FALSE.

A dimmer is considered as present if the MOSFET on-time is HIGH for a number of system clocks exceeding TON_COUNT_DIMPRES_TH. Again, a prolonged high MOSFET gate indicates that the voltage at the output of the dimmer is zero or very low, which will only arise if the mains signal has been reshaped by a dimmer.

The value of TON_COUNT_DIMPRES_TH is larger than TON_COUNT_VINOFF_TH. This is because the circuit must also be usable without the presence of any dimmer, for example with Vin directly connected to a rectified sine wave signal. All dimmers are designed such that the period where the output signal is 0V is at least ~2 ms (20% of a 50 Hz mains period). In order to distinguish between configurations with and without a dimmer, two thresholds are used in the measurement of the MOSFET on-time: TON_COUNT_VINOFF_TH and TON_COUNT_DIMPRES_TH, with TON_COUNT_VINOFF_TH set to be smaller than TON_COUNT_DIMPRES_TH.

Typically, the value of TON_COUNT_VINOFF_TH can be around 100 us and TON_COUNT_DIMPRES_TH is around 1.5 ms for example. If the MOSFET on-time exceeds TON_COUNT_VINOFF_TH without ever exceeding TON_COUNT_DIMPRES_TH then a system without dimmer is detected.

If the MOSFET on-time exceeds TON_COUNT_DIMPRES_TH then a dimmer is present.

In step 50, a flag identifying the presence of a dimmer (DIM_present) is set to false.

In step 51, the mains count TMAINS_COUNT_VAL is incremented by 1. This is because the method repeats every clock cycle TCLK.

The gate level of the boost transistor is detected in step 52.

If it is high, it is the on-time of the MOSFET and the value TON_COUNT_VAL (the number of system clock periods during the on-time of the MOSFET) is incremented in step 53.

In step 54 it is determined if the on-time system clock count exceeds the threshold TON_COUNT_VINOFF_TH. If it does, the input voltage is considered to be zero, so VIN_PRESENT is set to false in step 56. Before this change, in step 55, the value of PREVIOUS_VIN_PRESENT is made equal to the current value, so that the current and previous values are updated before the current value is changed.

It is then determined in step 57 if the on-time system clock count exceeds the threshold TON_COUNT_DIMPRES_TH. If it does, then a dimmer is detected and the flag DIM_PRESENT is set to true in step 58.

The process them moves to step 60, described below.

Thus, this branch of the process determines if an input signal is present and if a dimmer is present.

As mentioned above, the gate level of the boost transistor is detected in step 52.

If in step 52 it is detected that the gate level is low, then a different sequence is followed.

In step 61, it is determined if the previous gate level was high, i.e. if it is the first transition to a low gate level. If it is not the first transition to a low gate level, the process proceeds to step 60 (described below).

For the first transition to a low gate value, the flag VIN_PRESENT is checked to see if an input has already been detected as present, in step 62.

If an input has not already been detected as present (i.e. VIN_PRESENT is false), the period $T_{MAINS}$ is set as the clock period TCLK times the mains count value TMAINS_COUNT_VAL. This is carried out in step 63. This value is incremented during each cycle of the process (step 51)

In step 64, the dimming angle is calculated.

In step 65 the DIM_ON_COUNT_VAL is reset and the TMAINS_COUNT_VAL is reset.

The sequence of steps 63, 64, 65 is only carried out once, when the gate level first makes a transition from high to low. At this time, the value TMAINS_COUNT_VALUE has reached the number of cycles corresponding to the time period between successive cycles at which the gate level first makes its transition from high to low. Thus, TMAINS_COUNT_VALUE represents the number of cycles of TCLK in the full mains period. Similarly, DIM_ON_COUNT_VAL has been incremented a number of times corresponding to the time period when VIN is detected as present (step 74 described below) within that full mains cycle. Thus, DIM_ON_COUNT_VAL represents the number of clock cycles TCLK during the on period of VIN.

Thus, the dimming angle can be calculated in step 64 as proportional to the ratio of the clock cycles during VIN to the number of clock cycles of the full mains cycle. The ratio is applied to 180 degrees for a rectified signal as shown in FIG. 2 (to be consistent with the variable name DIM_ANGLE) i.e.:

DIM_ANGLE=180*DIM_ON_COUNT_VALUE/ TMAINS_COUNT_VAL.

The next steps enable the leading or trailing edge detection to be determined. Again, these steps are only carried out for the first high to low transition in the gate level (step 61). This is carried out when a dimmer is detected (DIM_PRESENT is true) and the previous VIN_PRESENT value is false. Note that VIN_PRESENT is set to true in step 71. This means the edge detection type is only carried out immediately when the transition occurs from VIN_PRESENT from false to true.

As there are only two types of dimmer, leading and trailing edge, the detection is only required of one type, leading edge for instance. In that case, it is necessary to consider what is happening at the rising front of the dimmer's output. The rising front is detected when there is a state change from LOW to HIGH in the VIN_PRESENT variable (current VIN_PRESENT is HIGH and previous VIN_PRESENT was LOW). Thus, detection can take place immediately after the transition in VIN_PRESENT. Thus, there is no need specifically to both detect leading and trailing edges.

This set of conditions is determined in step 66. If the conditions are satisfied, the TON_COUNT_VAL is compared with the threshold LEAD_DIM_TH. Note that the TON_COUNT_VAL was previously obtained during the cycle 53 to 58 when the transistor gate level was high.

A short count value indicates a rapid rise in VIN so that leading edge dimmer is detected in step 68. A longer count value indicates a slower rise in VIN so that a trailing edge dimmer is detected in step 69.

This example is based on detection of a leading edge dimmer based on the MOSFET on-time, when (in practice just after) the dimmer enters the on-state.

Instead, the algorithm can be used to detect a trailing edge dimmer based on the MOSFET on-time, when the dimmer enters the off-state. Only one of these detection methods needs to be carried out, since the two detection results are mutually exclusive.

In step 70, the value of PREVIOUS_VIN_PRESENT is made equal to the current value, so that the current and previous values are updated. In step 71, the current value VIN_PRESENT is set to true.

In step 72, the value TON_COUNT-VAL is set to zero, so that the next time the gate level goes high (detected in step 52), the count can restart from zero.

In step 60 the previous gate level is updated (i.e. set to the current gate level), ready for the next gate level reading in step 52.

In step 73, if VIN_PRESENT is true, then the count DIM_ON_COUNT_VAL is incremented for use in calculating the dimming angle at the next high to low gate level transition.

By this process, if a dimmer is present, its conduction angle as well as type can be performed. The detection of the dimmer type makes use of the on-time of the transistor just after the turning on of the dimmer.

An on-time below LEAD_DIM_TH indicates that the input voltage has increased sharply after the dimmer turns on and thus the presence of a leading edge dimmer otherwise a trailing edge dimmer is detected. The actual value of these timing limits is defined based on the application configuration and requirements. The conduction angle is calculated based on the ratio of the time duration where VIN_STATE is TRUE over the mains period.

Beyond the mentioned benefits of area and cost saving, timing detection allows also a higher level of flexibility to adjust the threshold level. It is done quite easily with a digital implementation.

For example, an integer value can be adjusted, which is used to compare with the actual counter value. Present technology can easily work with a system clock frequency much higher than the power converter switching frequency. This leads to quite accurate and fine resolution timing detection.

Figure 6:
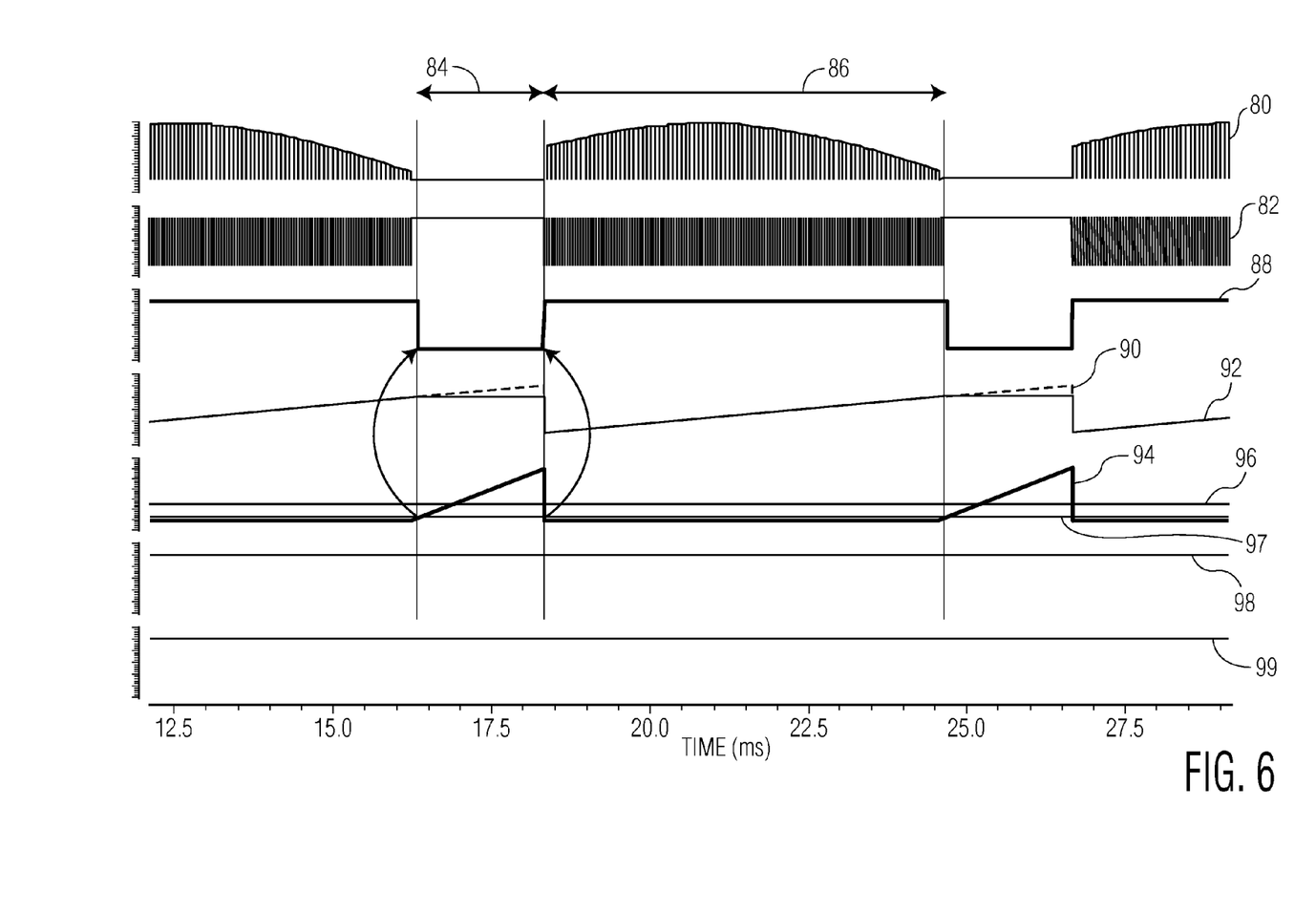
FIG. 6 is a timing diagram to explain the method of the invention.

FIG. 6 shows signal waveforms based on the proposed algorithm with a trailing edge dimmer.

The top plot 80 shows the dimmer output, which is in the form a rectified sine wave with a phase cut. The second plot 82 shows the transistor gate voltage. During the dimmer off period 84, there is no input signal and the gate voltage remains high, whereas during the dimmer on period 86, the input voltage is present and the transistor gate voltage switches. The transistor gate only switches off when the coil current exceeds a threshold.

Plot 88 shows the signal "VIN_PRESENT" which shows the detection of an input voltage.

Plot 90 shows the variable "TMAINS_COUNT_VAL" which counts the mains cycles in a ramp form. Plot 92 shows the variable "DIM_ON_COUNT_VAL" which counts the mains cycles in a ramp form only while the dimmer is on.

Plot 94 shows the variable "TON_COUNT_VAL" which counts for how long the transistor gate value has been high. When this exceeds a threshold, it is determined that the gate voltage remains high, and this triggers the falling edge in the "VIN_PRESENT" signal 88.

Plot 96 show the larger threshold level "TON_COUNT_DIMPRES_TH" used to detect the presence of a dimmer, and plot 97 shows the smaller threshold level "TON_COUNT_VINOFF_TH" used to trigger the falling edge in "VIN_PRESENT".

Plot 98 shows the "DIM_PRES" value, which indicates in this case that a dimmer has been detected, and plot 99 shows the "DIM_TYPE" value, which in this case indicates that a trailing edge dimmer is detected.

Figure 7A:
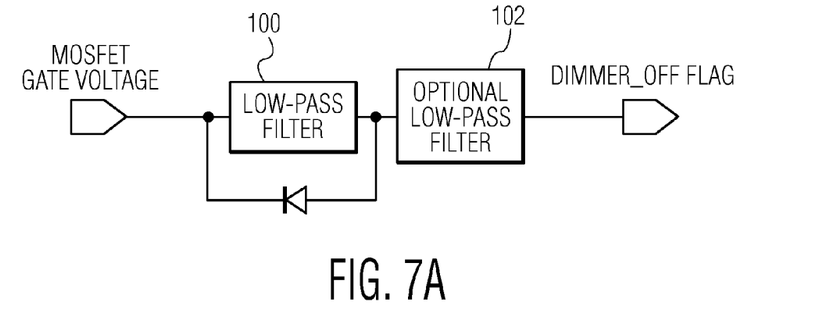
FIGS. 7a-c show analogue implementations of the invention.
Figure 7B:
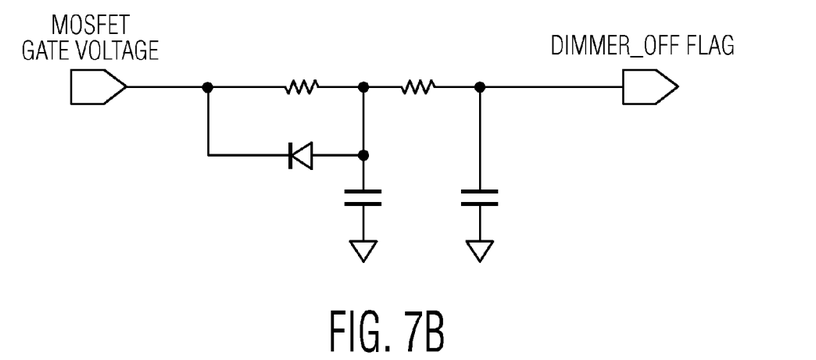
Figure 7C:
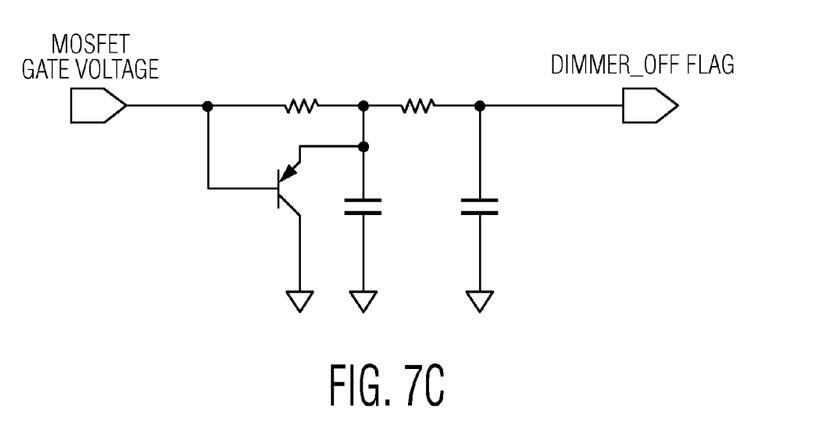

An analog variant of the dimmer state detector is shown in FIG. 7. For systems where only the on and off-state information is required, this is an interesting alternative to the more complex algorithm.

FIG. 7(a) shows a schematic circuit with the MOS gate voltage filtered by a first low pass filter 100 with a feedback diode and an optional second low pass filter 102. The diode is used to alter the time constant of the filter depending on the signal edge. When the MOSFET gate toggles quickly from HIGH to LOW with the output HIGH, and the diode starts conducting and discharges rapidly the output. This accelerates switching from HIGH to LOW of the output. When the MOSFET gate toggles from LOW to HIGH with the output LOW, the diode is blocked therefore the output is charged by the resistor only. This slows down the switching from LOW to HIGH of the output. This leads to the effect that the filter output will remain LOW if the gate voltage is switching rapidly.

It is possible to discriminate in an analog manner the period of time where the gate voltage is switching (i.e. the dimmer is turning the light on) compared to the time period when the gate voltage remains constantly HIGH (i.e. the dimmer is turning the light off). This analogue processing is the low pass filtering. FIGS. 7(b) and 7(c) show implementations of this circuit.

As a summary, the invention proposes a way to detect the dimmer's presence, type and conduction angle by measuring the on-time of the power MOSFET gate command. The on-time of such a command in a coil current control power converter gives direct information on the input voltage. As the power MOSFET gate command is always accessible in the power converter controller, this helps reducing the IC pin count and BoM in case of driver implementation using discrete components.

For the retro-fit LED lamp market, the footprint as well as cost is of primary importance. LED drivers exhibit low pin count (6 to 10 pins) therefore saving one pin can help selecting a lower cost package in case of an integrated solution. The cost reduction is also true in the case of a micro-controller based driver implementation as this allows analog comparators to be avoided and makes use of logic signal manipulation only. The driver IC cost is the dominating part in retro-fit LED lamp systems.

The example above is based on a boost convertor. The invention is applicable also to all other types of inductor based convertor such as buck, buck-boost, SEPIC or fly-back. All these converter types exhibit an identical MOSFET on-time dependency on the input voltage as the boost converter. Although the variation may not be a linear function as with the boost converter, it is the case that the MOSFET on-time increases with a decreasing input voltage.

It will be apparent from the description above that the invention can be implemented as a change to only controller 40, which is then for connected to a standard power converter. However, the invention also relates to the complete controller circuit (i.e. the controller 40 as well as the inductive power converter).

Various modifications will be apparent to those skilled in the art.

The invention claimed is:

1. An LED controller circuit, wherein the controller circuit is for controlling an inductive power converter which includes a transistor for conducting an inductor current, and the inductor is driven by a drive voltage (VIN) received from a dimmer circuit, wherein the controller circuit comprises:
    a feedback arrangement for controlling the transistor in response to upper and lower thresholds of the inductor current; and
    a processor for determining, based on an analysis or signal processing of the on-time of the transistor, dimmer characteristics, including at least the dimmer type being leading edge or trailing edge and the on state and off states of the ac dimmed voltage signal.

2. A circuit as claimed in claim 1, wherein the processor is adapted to determine the dimmer characteristics based on the gate signal of the transistor.

3. A circuit as claimed in claim 1, wherein the processor is adapted to determine an off-state of the dimmer when the transistor on-time exceeds a certain limit.

4. A circuit as claimed in claim 3, wherein the processor is adapted to detect an on-state of the dimmer as soon as the transistor is switched off.

5. A circuit as claimed in claim 1, wherein the processor is adapted to monitor the input voltage variation based on the transistor on-time variation.

6. A circuit as claimed in claim 1, wherein the processor is adapted to detect whether leading edge or trailing edge dimming is implemented, and is adapted:
    to detect a leading edge dimmer based on the MOSFET on-time when the dimmer enters the on-state; or
    to detect a trailing edge dimmer based on the MOSFET on-time, when the dimmer enters the off-state.

7. A circuit as claimed in claim 1, wherein an analog circuit replaces the processor for determining the on-state and off-state of the dimmer, based on analog processing of the transistor gate signal.

8. A circuit as claimed in claim 1, further comprising:
    the inductive power converter which comprises the transistor and the inductor; and
    a sense resistor.

9. A method of detecting dimmer characteristics from a dimmed ac input voltage signal, comprising:
    driving an inductor using the input voltage;
    conducting the inductor current through a transistor;
    controlling the transistor in response to upper and lower thresholds of the inductor current; and
    determining, based on an analysis of the on-time of the transistor, dimmer characteristics, including at least the on state and off states of the ac dimmed voltage signal; and
    determining the dimmer characteristics based on the gate signal of the transistor.

10. A method as claimed in claim 9, comprising monitoring the input voltage variation based on the transistor on-time variation.

11. A method of detecting dimmer characteristics from a dimmed ac input voltage signal, comprising:
    driving an inductor using the input voltage;
    conducting the inductor current through a transistor;
    controlling the transistor in response to upper and lower thresholds of the inductor current; and
    determining, based on an analysis of the on-time of the transistor, dimmer characteristics, including at least the on state and off states of the ac dimmed voltage signal; and
    determining an off-state of the dimmer when the transistor on-time exceeds a certain limit and detecting an on-state of the dimmer as soon as the transistor is switched off.

12. A method of detecting dimmer characteristics from a dimmed ac input voltage signal, comprising:
    driving an inductor using the input voltage;
    conducting the inductor current through a transistor;
    controlling the transistor in response to upper and lower thresholds of the inductor current; and determining, based on an analysis of the on-time of the transistor, dimmer characteristics, including at least the on state and off states of the ac dimmed voltage signal; and detecting whether leading edge or trailing edge dimming is implemented, by detecting a leading edge dimmer based on the MOSFET on-time, when the dimmer enters the on-state or by detecting a trailing edge dimmer based on the MOSFET on-time, when the dimmer enters the off-state.

13. A method of detecting dimmer characteristics from a dimmed ac input voltage signal, comprising:

driving an inductor using the input voltage;

conducting the inductor current through a transistor;

controlling the transistor in response to upper and lower thresholds of the inductor current; and determining, based on an analysis of the on-time of the transistor, dimmer characteristics, including at least the on state and off states of the ac dimmed voltage signal; and using an analogue circuit for determining the on-state and off-state of the dimmer based on analogue processing of the transistor gate signal.

* * * * *